US012768194B2

(12) United States Patent
Glaser

(10) Patent No.: US 12,768,194 B2
(45) **Date of Patent: *Oct. 20, 2026**

(54) HARDWARE ASSEMBLY

(71) Applicant: LIBERTY HARDWARE MFG. CORP., Winston-Salem, NC (US)

(72) Inventor: Michael Glaser, Winston-Salem, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 52 days.

This patent is subject to a terminal disclaimer.

(21) Appl. No.: 19/053,610

(22) Filed: Feb. 14, 2025

(65) Prior Publication Data

US 2025/0188768 A1 Jun. 12, 2025

Related U.S. Application Data

(63) Continuation of application No. 18/302,376, filed on Apr. 18, 2023, now Pat. No. 12,252,900.

(51) Int. Cl.
*E05B 1/00* (2006.01)
*A47B 95/02* (2006.01)
*F16B 33/00* (2006.01)

(52) U.S. Cl.
CPC .......... *E05B 1/0015* (2013.01); *E05B 1/0007* (2013.01); *F16B 33/00* (2013.01); *A47B 2095/024* (2013.01); *A47B 2095/028* (2013.01)

(58) Field of Classification Search
CPC ........ A47B 2095/024; A47B 2095/028; E05B 1/00; E05B 1/0007; E05B 1/0015; F16B 33/00
USPC .................................................... 16/414, 417
See application file for complete search history.

(56) References Cited

U.S. PATENT DOCUMENTS

| | | | | | |
|---|---|---|---|---|---|
| 33,759 | A * | 11/1861 | Ward | ....................... | A45C 1/04 16/417 |
| 190,855 | A | 5/1877 | Hendryx | | |
| 210,673 | A | 12/1878 | Cunliff | | |
| 1,476,384 | A | 12/1923 | Wellington | | |
| 1,487,355 | A | 3/1924 | Overmyer | | |
| 1,490,854 | A | 4/1924 | Rutter | | |
| 1,601,160 | A | 9/1926 | Busch | | |
| 1,639,159 | A | 8/1927 | Anderson | | |
| 1,755,301 | A | 4/1930 | McCullough | | |
| 1,798,409 | A | 3/1931 | Ferris | | |
| 1,936,775 | A * | 11/1933 | Stedman | ............... | B29C 43/203 264/318 |

(Continued)

FOREIGN PATENT DOCUMENTS

| | | | |
|---|---|---|---|
| FR | 1214030 | A | 4/1960 |
| KR | 200429053 | Y1 | 10/2006 |

*Primary Examiner* — Jeffrey O'Brien
(74) *Attorney, Agent, or Firm* — Brooks Kushman P.C.; Jeffrey Doyle

(57) ABSTRACT

A hardware assembly is provided with a threaded handle for a drawer or door. A threaded rod is provided for threaded engagement with the threaded handle, with a length to extend through the drawer or door. A threaded fastener is sized for threaded engagement with the threaded rod to engage the drawer or door spaced apart from the handle to fasten the handle to the drawer or door. At least one weakened region is formed in the threaded rod to permit separation of an unused portion of the rod from an installed portion of the rod.

19 Claims, 3 Drawing Sheets

(56) References Cited

U.S. PATENT DOCUMENTS

| | | | | | |
|---|---|---|---|---|---|
| 2,703,725 | A | * | 3/1955 | Vagi | A47B 95/02 70/461 |
| 2,796,627 | A | * | 6/1957 | Heyer | E05B 1/0015 411/959 |
| 2,893,458 | A | * | 7/1959 | Flora | E05B 1/0015 411/970 |
| 3,156,944 | A | | 11/1964 | Bohn | |
| 3,174,178 | A | * | 3/1965 | Dimmer | E05B 1/0015 D7/393 |
| 3,812,757 | A | | 5/1974 | Reiland | |
| 4,659,267 | A | | 4/1987 | Uno et al. | |
| 5,076,746 | A | | 12/1991 | Fischer et al. | |
| 5,255,413 | A | * | 10/1993 | Sabo | E05B 1/0015 16/DIG. 30 |
| 5,722,119 | A | | 3/1998 | Wang | |
| 5,727,858 | A | * | 3/1998 | Shapiro | A47B 95/02 16/416 |
| 6,053,653 | A | | 4/2000 | Tanaka et al. | |
| 10,893,749 | B1 | | 1/2021 | Pifer | |
| 11,044,992 | B1 | | 6/2021 | Yuki et al. | |
| 11,445,825 | B2 | * | 9/2022 | Pifer | A47B 95/02 |
| 2008/0075555 | A1 | * | 3/2008 | March | F16B 39/026 411/361 |
| 2014/0227061 | A1 | | 8/2014 | Platt | |
| 2019/0085886 | A1 | | 3/2019 | Davis et al. | |
| 2019/0360234 | A1 | | 11/2019 | Alkoby | |
| 2021/0093085 | A1 | * | 4/2021 | Pifer | A47B 95/02 |
| 2022/0408919 | A1 | | 12/2022 | Pifer et al. | |
| 2023/0175543 | A1 | | 6/2023 | Schneider et al. | |

* cited by examiner

HARDWARE ASSEMBLY

CROSS-REFERENCE TO RELATED APPLICATIONS

This application is a continuation of U.S. application Ser. No. 18/302,376 filed Apr. 18, 2023, now U.S. Pat. No. 12,252,900, the disclosure of which is hereby incorporated in its entirety by reference herein.

TECHNICAL FIELD

Various embodiments relate to hardware assemblies for drawers or doors for cabinets, furniture, or the like.

BACKGROUND

Pifer U.S. Pat. No. 10,893,749 B1 issued to Liberty Hardware Mfg. Corp., on Jan. 19, 2021 and discloses hardware handle assemblies.

SUMMARY

According to an embodiment, a hardware assembly is provided with a threaded handle for a drawer or door. A threaded rod is provided for threaded engagement with the threaded handle, with a length to extend through the drawer or door. A threaded fastener is sized for threaded engagement with the threaded rod to engage the drawer or door spaced apart from the handle to fasten the handle to the drawer or door. At least one weakened region is formed in the threaded rod to permit separation of an unused portion of the rod from an installed portion of the rod.

According to a further embodiment, the at least one weakened region is oriented outside a region of threaded engagement between the threaded rod and the threaded fastener.

According to another further embodiment, the at least one weakened region is spaced apart from the threaded handle.

According to another further embodiment, the at least one weakened region is further defined as a transverse notch formed in the threaded rod.

According to another further embodiment, the at least one weakened region is further defined as a plurality of weakened regions.

According to an even further embodiment, at least one of the plurality of weakened regions is oriented outside a region of threaded engagement between the threaded rod and the threaded fastener.

According to another further embodiment, the at least one weakened region is further defined as a plurality of incrementally spaced weakened regions.

According to another further embodiment, the threaded rod is not provided with an integrally formed fastener head.

According to another further embodiment, the threaded fastener is formed with an internally threaded through hole.

According to an even further embodiment, the threaded fastener is further provided as a nut.

According to another even further embodiment, the nut is externally contoured for manual installation.

According to another further embodiment, the threaded handle includes an internally threaded aperture formed therein.

According to another further embodiment, the threaded rod is externally threaded.

According to another further embodiment, the handle is further provided as a knob or pull.

According to another further embodiment, the threaded rod is further provided from a steel material.

According to another further embodiment, the threaded rod is further provided from a structural polymer.

According to another further embodiment, the threaded rod is further provided with a first threaded region with a first thread sized to engage the threaded handle, and a second threaded region with a second thread that is different than the first thread and sized to engage the threaded fastener.

According to another embodiment, a hardware assembly is provided with a handle for a drawer or door, with an internally threaded aperture formed therein. An externally threaded rod is provided for threaded engagement with the threaded handle, with a length to extend through the drawer or door. An internally threaded nut is sized for threaded engagement with the threaded rod to engage the drawer or door spaced apart from the handle to fasten the handle to the drawer or door. A plurality of weakened regions is formed in the threaded rod spaced apart from the handle, to permit separation of an unused portion of the rod, outside a region of threaded engagement between the threaded rod and the threaded nut, from an installed portion of the rod.

According to another embodiment, a method to install hardware to a drawer or door, is provided by installing a threaded rod into threaded engagement with a handle. The threaded rod is installed into an aperture formed through a drawer or door. A threaded fastener is installed to the threaded rod to fasten the handle to the drawer or door. The threaded fastener is shortened at a weakened region outside of the threaded fastener.

According to a further embodiment, the threaded fastener is shortened after the threaded rod is installed into engagement with the handle, after the threaded rod is installed into the aperture formed through the drawer or door, and after the threaded fastener is installed to the threaded rod.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Cabinet hardware is typically provided with a standard screw that only works with a certain range of cabinet or drawer thicknesses. There are consumers who have cabinets or drawers of non-standard thicknesses, on which they may not be able to install knobs or pulls with standard screws. Consumers may also find that while a certain standard screw technically "reaches" the knob or pull through their cabinet/drawer, the thread engagement is minimal and therefore more subject to risk of failure.

Figure 1:
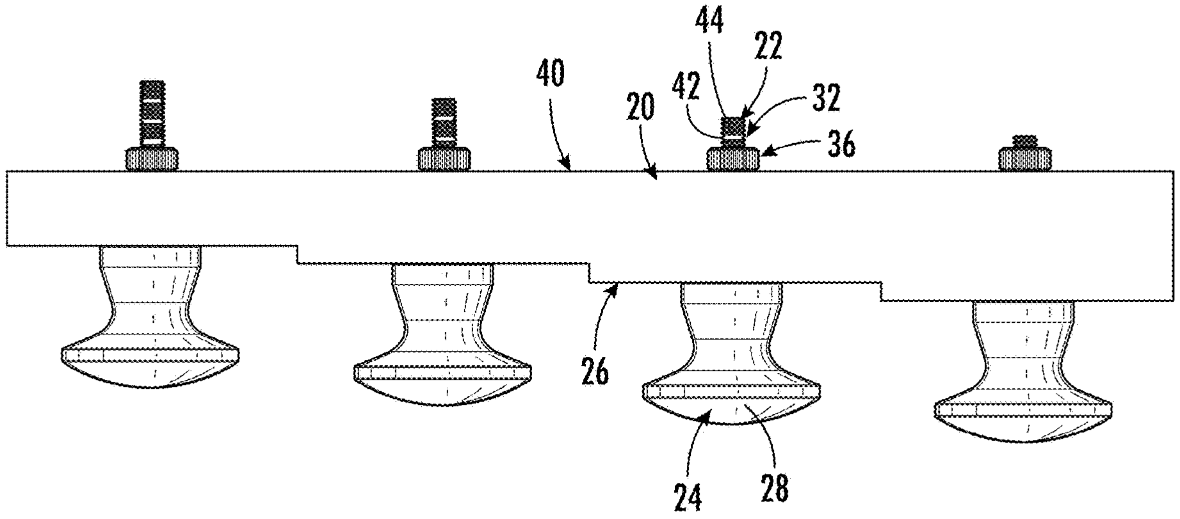
FIG. 1 illustrates a portion of a drawer or door with a plurality of hardware assemblies according to an embodiment, installed at a plurality of positions of the portion of the drawer or door.
Figure 2:
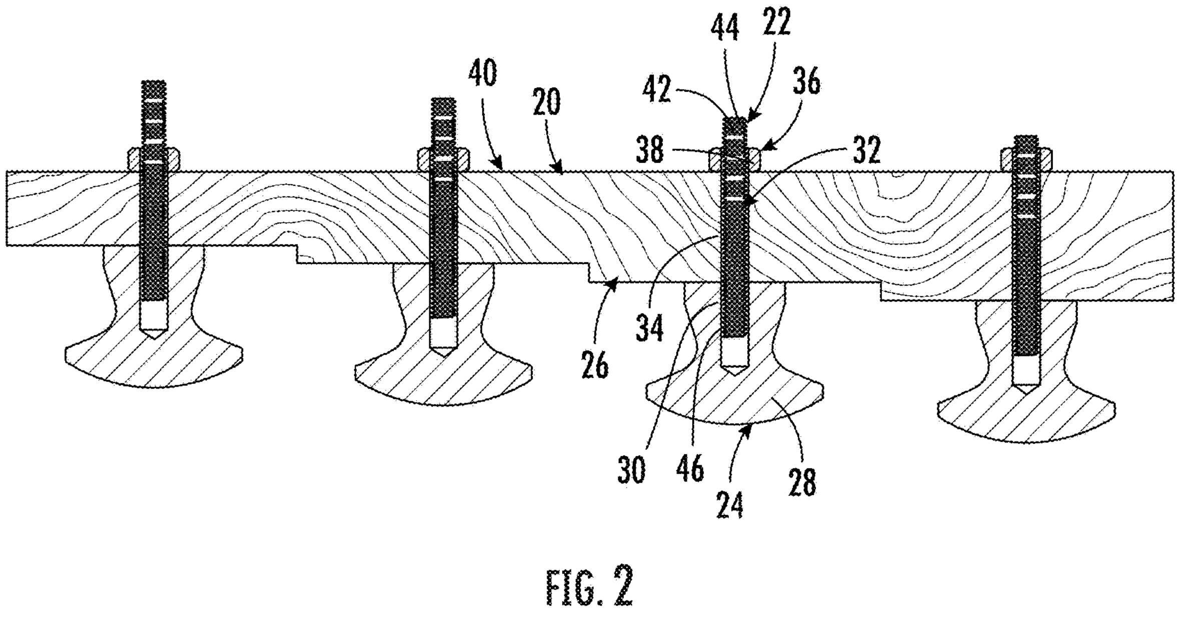
FIG. 2 is a partial section view of the portion of the drawer or door and the plurality of hardware assemblies of FIG. 1.

FIGS. 1 and 2 illustrate a panel 20 of a drawer or door for a cabinet, furniture, or the like. The panel 20 includes various thicknesses for the sake of illustration, as it is common that panels 20 are provided with different thicknesses. The panel 20 is illustrated in combination with a plurality of hardware assemblies 22 according to an embodiment. Each of the hardware assemblies 22 is illustrated installed at a different thickness of the panel 20 to demonstrate the flexibility and adjustability of the hardware assembly 22.

The hardware assembly 22 is further defined as a handle assembly 22 to assemble a handle 24 to the panel 20. The handle 24 is assembled to an exterior surface 26 of the panel 20. The handle 24 has a body 28 that is sized and contoured for a user to grasp the handle 24 to slide, pivot, or otherwise move, the panel 20, and consequently the drawer or door. In the depicted embodiment, the handle 24 is a knob 24, which may have radial symmetry as depicted. According to another embodiment, the handle 24 is a pull handle 24, which may have more than one connection to the panel 20.

As illustrated in FIG. 2, the handle 24 includes a threaded region 30. According to an embodiment, the threaded region 30 is an internally threaded aperture 30 formed to a blind depth within the body 28 of the handle 24 for receipt of an externally threaded fastener.

Each handle assembly 22 includes a threaded rod 32 that is sized to extend through a through aperture 34 (FIG. 2) formed through the panel 20. The threaded rod 32 is externally threaded for engagement within the threaded aperture 30 of the handle 24. The threaded rod 32 is sized with a length to extend through panels 20 of different thicknesses, as demonstrated in FIGS. 1 and 2.

The handle assembly 22 also includes a threaded fastener 36 installed on the threaded rod 32. With reference to FIG. 2, the threaded fastener 36 is formed with an internally threaded through hole 38 in threaded engagement with the threaded rod 32. The threaded fastener 36 is a nut 36 and is tightened to engage an internal surface 40 of the panel to fasten the handle 24 to the panel 20.

As illustrated in FIGS. 1 and 2, the handle assembly 22 can be installed to panels 20 of varying thicknesses. Rather than providing threaded rods 32 of different lengths, the handle assembly 22 includes the threaded rod 32 that can be shortened to different lengths. For example, as illustrated in FIGS. 1-4, the threaded rod 32 includes at least one weakened region 42 to permit separation of a distal unused portion 44 of the threaded rod 32 on the internal surface 40 of the panel 20 from an installed portion 46 (FIGS. 2-4) of the threaded rod 32. According to an embodiment, the weakened region 42 is a transverse notch 42 formed partially into the threaded rod 32. To permit the threaded rod 32 to be shortened to various lengths for varying panel 20 thicknesses, a plurality of incrementally spaced transverse notches 42 are formed into the threaded rod 32.

Each transverse notch 42 is spaced apart from the handle 24 so that the distal end 44 of the threaded rod 32 can be removed at the internal surface 40 of the panel 20. This arrangement may be referred to as a reverse breakaway fastener 32. The notches 42 are oriented so that the notch 42 that is employed for breaking the distal portion 44 from the installed portion 46 is outside of a region of threaded engagement between the threaded rod 32 and the threaded nut 36.

Figure 3:
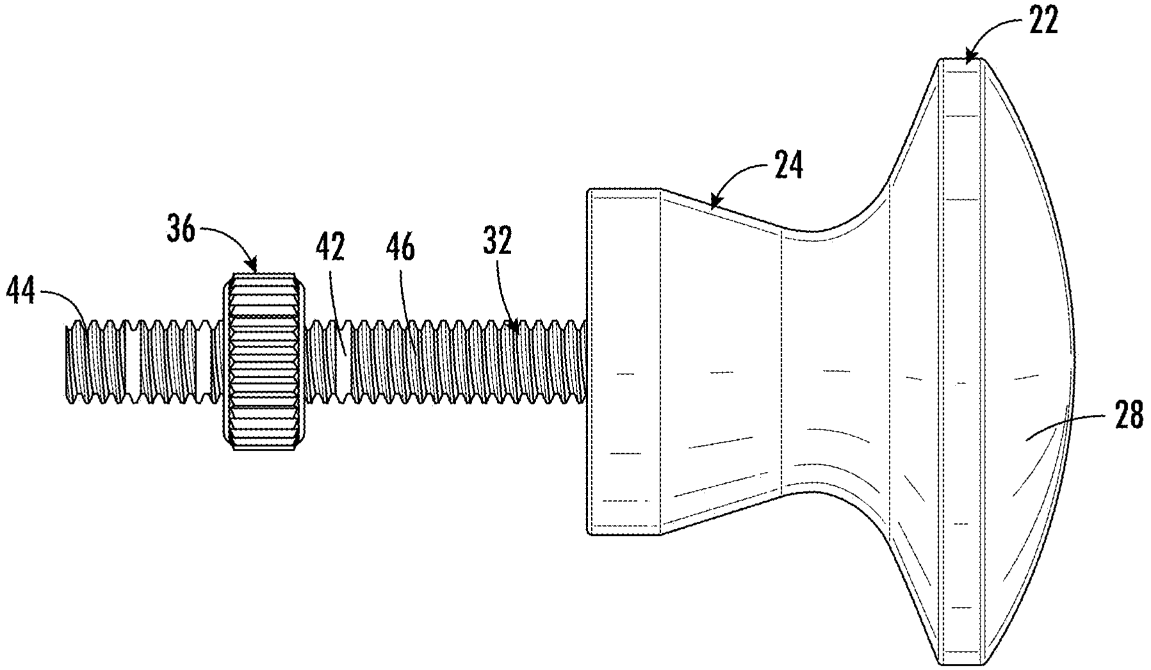
FIG. 3 is a side view of one of the hardware assemblies of FIG. 1.
Figure 4:
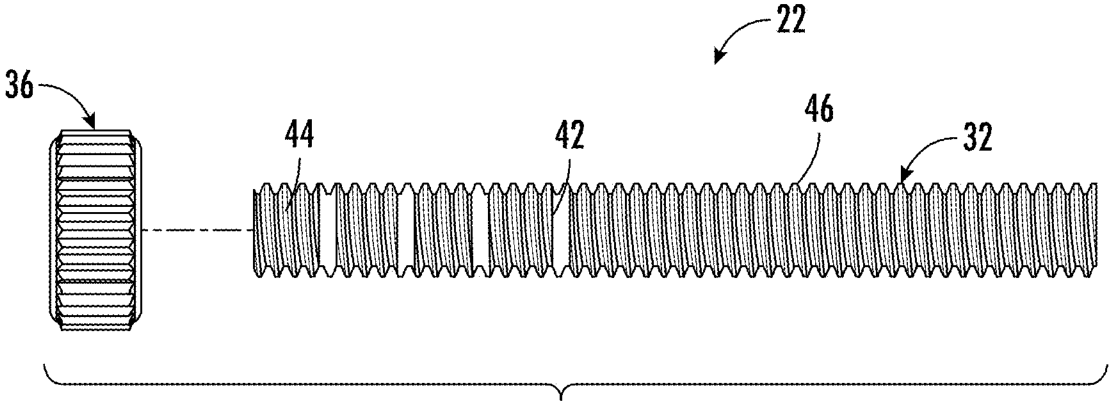
FIG. 4 is an exploded view of side view of a subassembly of the hardware assembly of FIG. 3.
Figure 5:
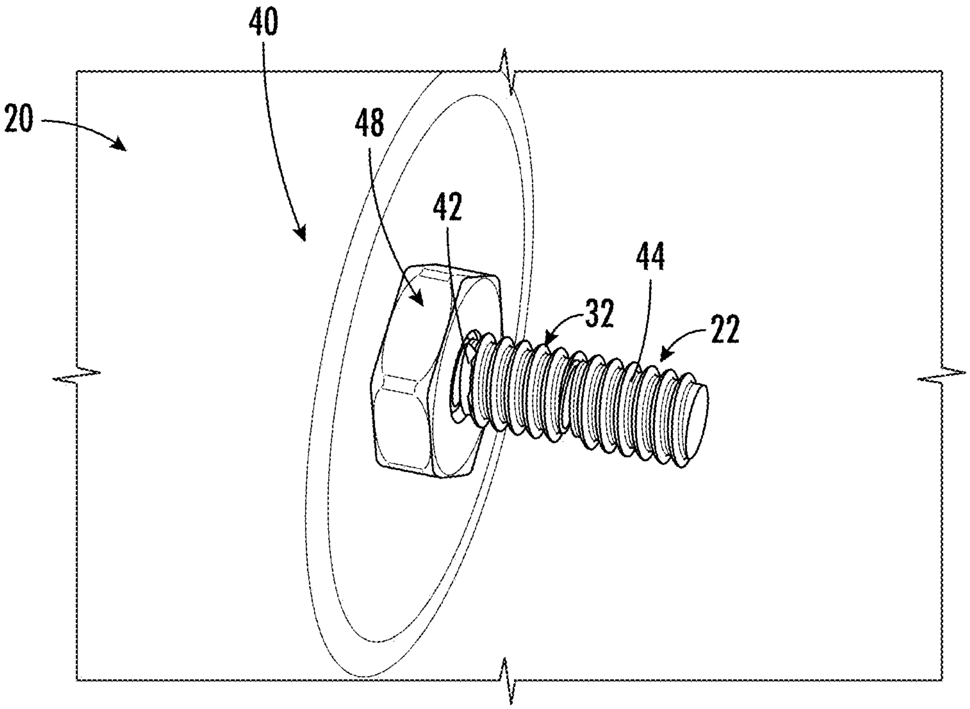
FIG. 5 is an enlarged perspective view of a portion of a drawer or door with one of the hardware assemblies of FIG. 1, illustrated during an intermediate installation step.
Figure 6:
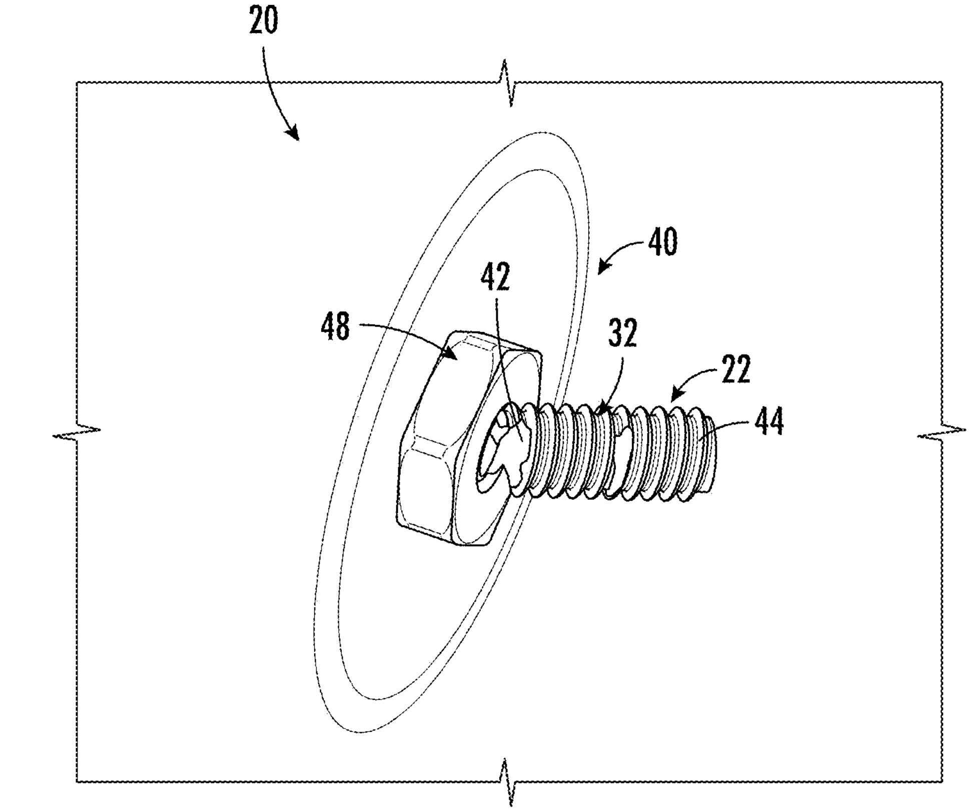
FIG. 6 is another enlarged perspective view of the portion of the drawer or door of and the hardware assembly of FIG. 5, illustrated during a subsequent installation step.

As illustrated in FIGS. 3 and 4, the nut 36 is externally splined according to an embodiment. The external spline of the nut 36 permits an installer to manually rotate the nut 36 to fasten the handle 24 to the panel 20. Alternatively, a nut 48 with wrench flats may be employed as illustrated in FIGS. 5 and 6 for installation of the nut 48 with a wrench. FIG. 5 illustrates the handle assembly 22 after installation of the nut 48. Subsequently, in FIG. 6, the distal portion 44 is forced away from the nut 48, thereby deforming the threaded rod 32 at the first exposed notch 42 beyond the nut 48. Further manipulation of the distal end 44 breaks the threaded rod 32 through the notch 42 for removal and disposal of the distal end 44.

The handle assembly 22 of FIGS. 1-6 provides a handle assembly 22 that accommodates a wide range of consumer needs by permitting installation in a range of thicknesses of the panel 20 of the cabinets or drawers on which knobs 24 or pulls 24 can be installed. The handle assembly 22 also alleviates some of the shortcomings and customer frustrations of prior art breakaway fastener arrangements.

For example, the prior art often provides a breakaway screw with a fastener head to engage the internal surface of the panel and notches in a terminal end of the screw that is fastened within a body of a handle. Such prior art arrangements require the installer to break off a portion of the fastener before installing the fastener into the handle. Additionally, such prior art breakaway screws cause damage or otherwise compromise the threads prior to installation so that installation becomes difficult or impossible. The notches of the prior art breakaway fasteners are often too shallow, thereby requiring excessive effort and/or tools to shorten the length of the screw.

The handle assembly 22 uses the combination of the notched threaded rod 32 and the thumb nut 36 to omit a single prior art screw with a fastener head. The notches 42 or breakaway points are similarly featured near one end of the threaded rod 32, and face towards the inside of the cabinet/drawer panel 20 instead of the outside. This orientation keeps the weakened parts of the rod 32 away from critical load-bearing points. The consumer engages all threads 30, 46, 38, (knob or pull 24, threaded rod 32, and nut 36) before snapping the rod 32 at one of the notches 42, which eliminates an opportunity for compromised threads. This process of installation also ensures a maximum thread engagement between the threaded rod 32 and the knob or pull 24 before the rod 32 is snapped to length.

The handle assembly 22 features the threaded rod 32 with notches 42, which may be cuts perpendicular to a lengthwise axis of the rod 32, to design the locations of breakaway points. This feature allows for the installer or consumer to snap the rod 32 down to one of a few predetermined lengths.

The rod 32 may be threaded with a standard pitch to mate with common cabinet knobs and pulls 24. Alternatively, the distal end 44 of the threaded rod 32 may have a different thread diameter or thread pitch to avoid inadvertent assembly of the distal end 44 within the handle threads 30. In such an alternative, the nut 36 is provided with the same thread diameter and pitch of the distal end 44 of the threaded rod 32. Although the outer perimeter of the nut 36 is illustrated with fine grooves or splines, the nut 36 may be provided with knurling for easy finger handling and tightening.

According to one embodiment, the threaded rod 32 is formed from a steel material. According to another embodiment, the threaded rod 32 is provided from a structural polymer.

According to an embodiment, the handle assembly 22 is installed to the panel, whereby the threaded rod 32 is first installed into threaded engagement within the threaded region 30 of the knob or pull 24. Then, the threaded rod 32 is inserted through the aperture 34 on the cabinet/drawer panel 20. The thumb nut 36 is then tightened onto the threaded rod 32 on the other side of the cabinet/drawer face 20. Once the knob or pull 24 is securely in place, the consumer can note how much excess threaded rod 32 there is (if any) and snap it off at the nearest notch 42 or breakaway point as illustrated in FIGS. 5 and 6.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hardware assembly comprising:
- a threaded handle for a drawer or door;
- a threaded rod for threaded engagement with the threaded handle, with a length to extend through an aperture formed through the drawer or door; and
- a threaded fastener sized for threaded engagement with the threaded rod to engage the drawer or door and spaced apart from the handle to fasten the handle to the drawer or door;
- wherein at least one weakened region is formed in the threaded rod to permit separation of an unused portion of the rod from an installed portion of the rod;
- wherein the at least one weakened region is spaced apart from the threaded handle;
- wherein the at least one weakened region is oriented outside a region of threaded engagement between the threaded rod and the threaded fastener; and
- wherein the at least one weakened region is further defined as a transverse notch formed in the threaded rod.

2. The hardware assembly of claim 1, wherein the transverse notch is formed partially into the threaded rod.

3. The hardware assembly of claim 1, wherein the transverse notch is cut into the threaded rod perpendicular to a lengthwise axis of the rod.

4. The hardware assembly of claim 1, wherein the at least one weakened region is further defined as a plurality of weakened regions.

5. The hardware assembly of claim 4, wherein at least one of the plurality of weakened regions is oriented outside a region of threaded engagement between the threaded rod and the threaded fastener.

6. The hardware assembly of claim 1, wherein the at least one weakened region is further defined as a plurality of incrementally spaced weakened regions.

7. The hardware assembly of claim 1, wherein the threaded rod does not comprise an integrally formed fastener head.

8. The hardware assembly of claim 1, wherein the threaded fastener is formed with an internally threaded through hole.

9. The hardware assembly of claim 8, wherein the threaded fastener further comprises a nut.

10. The hardware assembly of claim 9, wherein the nut is externally contoured for manual installation.

11. The hardware assembly of claim 10, wherein the nut is externally splined for manual installation.

12. The hardware assembly of claim 1, wherein the threaded handle includes an internally threaded aperture formed therein.

13. The hardware assembly of claim 1, wherein the threaded rod is externally threaded.

14. The hardware assembly of claim 1, wherein the handle further comprises a knob or pull.

15. The hardware assembly of claim 1, wherein the threaded rod is formed from a steel material.

16. The hardware assembly of claim 1, wherein the threaded rod further comprises a structural polymer.

17. The hardware assembly of claim 1, wherein the threaded rod further comprises:
- a first threaded region with a first thread sized to engage the threaded handle; and
- a second threaded region with a second thread that is different than the first thread and sized to engage the threaded fastener.

18. A hardware assembly comprising:
- a threaded handle for a drawer or door;
- a threaded rod for threaded engagement with the threaded handle, with a length to extend through an aperture formed through the drawer or door; and
- a threaded fastener sized for threaded engagement with the threaded rod to engage the drawer or door and spaced apart from the handle to fasten the handle to the drawer or door;
- wherein at least one weakened region is formed in the threaded rod to permit separation of an unused portion of the rod from an installed portion of the rod;
- wherein the threaded handle includes an internally threaded aperture formed therein; and
- wherein the threaded rod is externally threaded.

19. The hardware assembly of claim 18, wherein the at least one weakened region is spaced apart from the threaded handle.

* * * * *